Sept. 20, 1932.  C. A. HAUSSER ET AL  1,878,847
HEMOGLOBINOMETER
Filed March 16, 1928  3 Sheets-Sheet 1
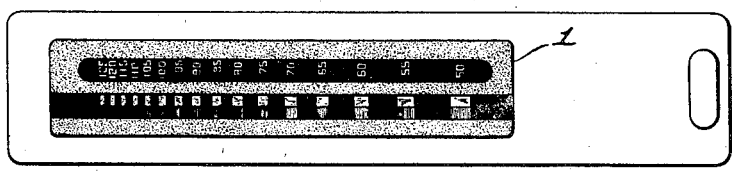
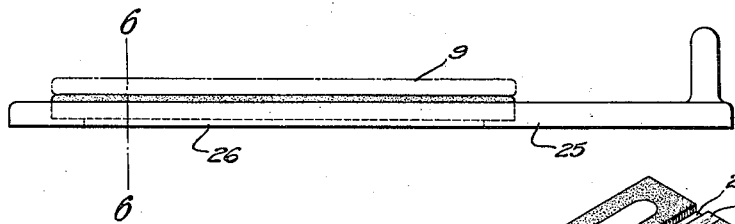
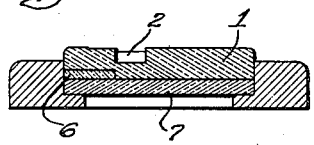
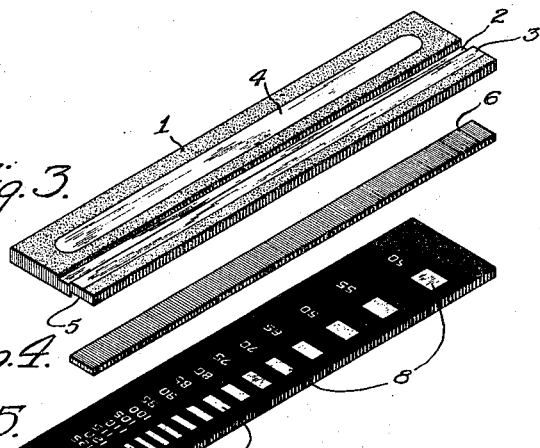
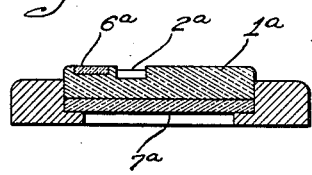
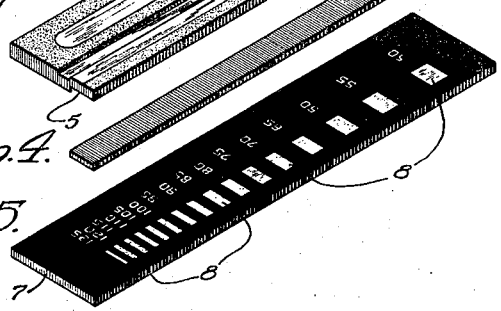
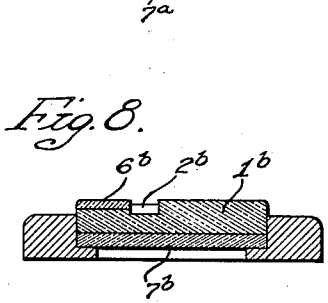
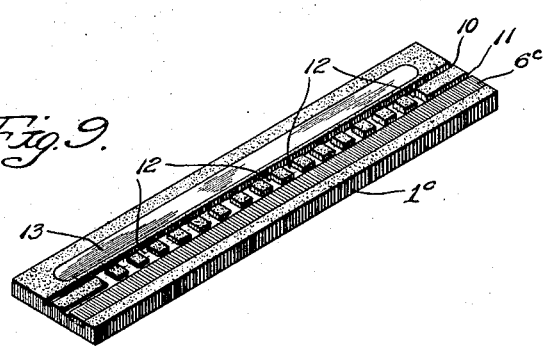
Inventor
Carl A. Hausser
Anthony A. Hausser
by their Attorneys,
Howson & Howson Sept. 20, 1932.      C. A. HAUSSER ET AL      1,878,847
HEMOGLOBINOMETER
Filed March 16, 1928      3 Sheets-Sheet 2

Inventor
Carl A. Hausser
Anthony A. Hausser
by their Attorneys
Howson & Howson

Sept. 20, 1932.  C. A. HAUSSER ET AL  1,878,847
HEMOGLOBINOMETER
Filed March 16, 1928   3 Sheets-Sheet 3
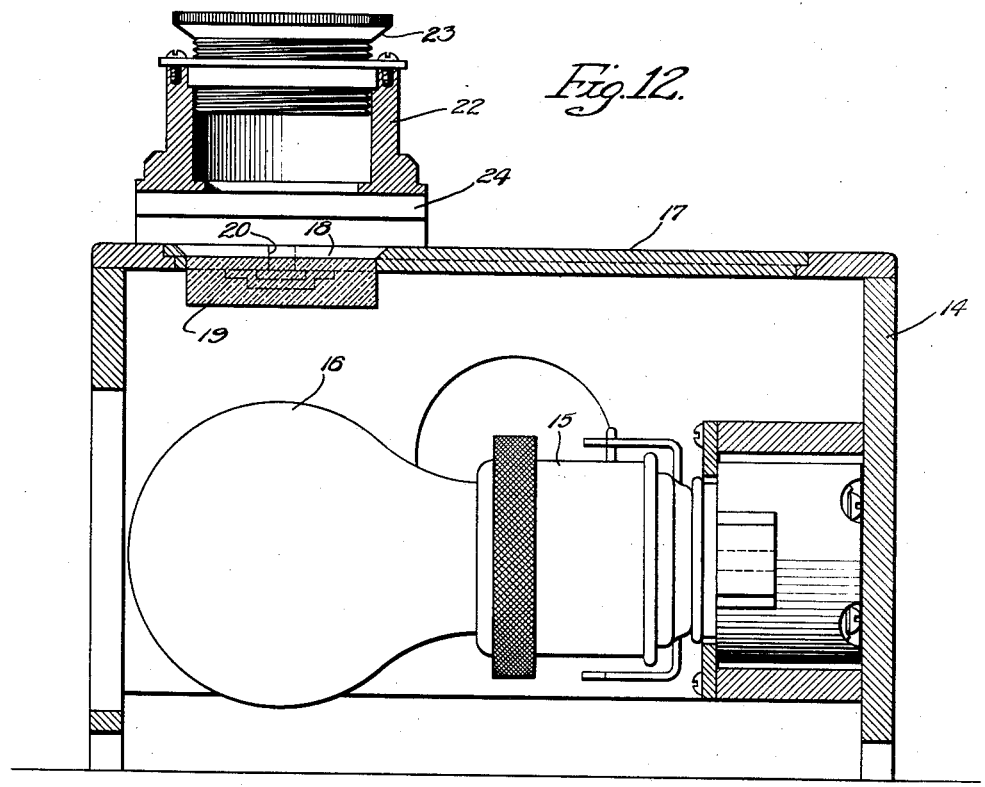
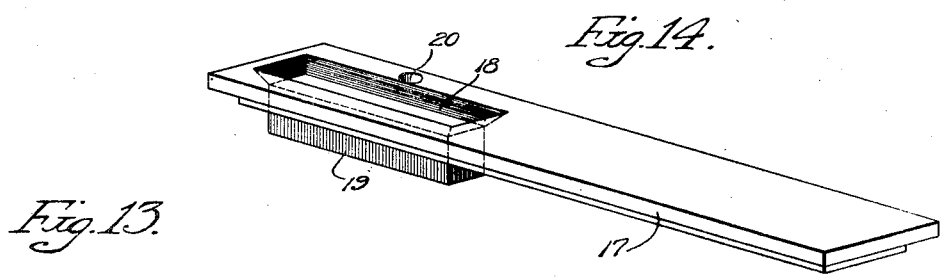
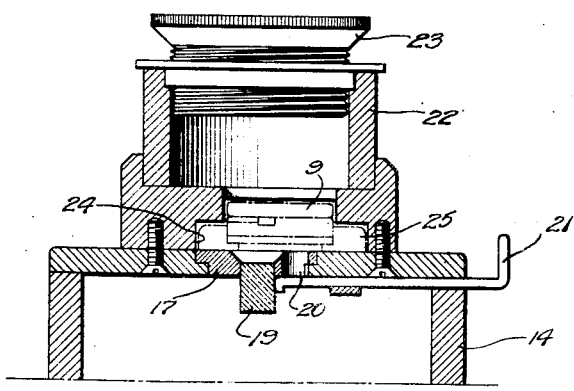
Inventor
Carl A. Hausser
Anthony A. Hausser
by their Attorneys
Howson & Howson Patented Sept. 20, 1932

1,878,847

UNITED STATES PATENT OFFICE

CARL ADOLPH HAUSSER AND ANTHONY ADOLPH HAUSSER, OF PHILADELPHIA, PENNSYLVANIA

HEMOGLOBINOMETER

Application filed March 16, 1928. Serial No. 262,242.

This invention relates primarily to improvements in hemoglobinometers, and the principal object of the invention is to increase generally the precision of this type of instrument and to provide a device with which uniformly accurate and precise tests of hemoglobin may be made.

To this end, the invention contemplates the provision of a hemoglobinometer so constructed as to afford a visual deliberation of two or more clearly defined and preferably adjacent areas of one color factor in their comparative relation to another, as hereinafter detailed:

A hemoglobinometer in which the differential color factor, and preferably also the other factor, is in effect composed of a plurality of segregated areas or sections;

A hemoglobinometer in which the color factors are so relatively arranged that the eye in passing from one to the other for comparison is not distracted by intervening elements;

A hemoglobinometer in which the blood solution is made the differential color factor, whereby a cause of error is avoided, as hereinafter set forth; and A hemoglobinometer in which both color factors are provided with a uniform surface appearance whereby the eye of an observer in passing from one factor to the other requires no adjustment.

Another object of the invention is to provide novel means for bringing the color of the blood solution and the standard color into substantial conformity so that any discernible difference is one of shade alone, thereby materially aiding and, in fact, making possible an accurate comparison.

The invention further resides in certain novel structural details conferring upon the hemoglobinometer highly desirable characteristics hereinafter enumerated.

In the attached drawings:

Figure 1 is a plan view of a device made in accordance with our invention;

Fig. 2 is a side elevation of the device;

Figs. 3, 4 and 5 are views in perspective of the individual parts which make up the embodiment of our invention illustrated in Figs. 1 and 2;

Fig. 6 is a transverse section on the line 6—6, Fig. 2, with plate 9 omitted;

Figs. 7 and 8 are transverse sections similar to that of Fig. 6 but illustrating modifications of the device within the scope of the invention;

Fig. 9 is a view in perspective of a further embodiment of the invention;

Figure 10:
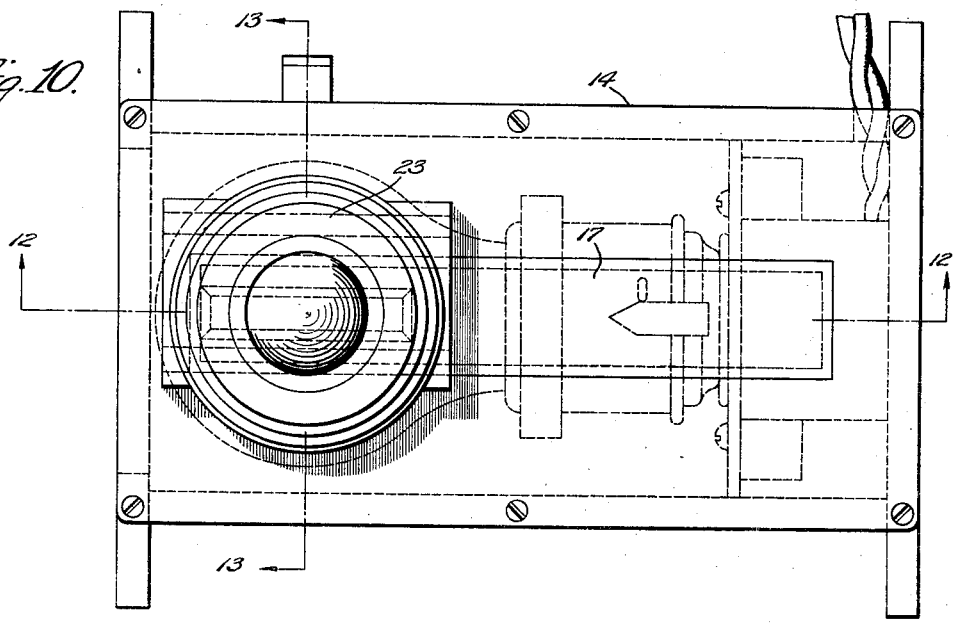
Figs. 10 and 11 are, respectively, plan and side elevations of a preferred form of turret for use with the hemoglobinometer slide illustrated in the preceding figures.
Figure 11:
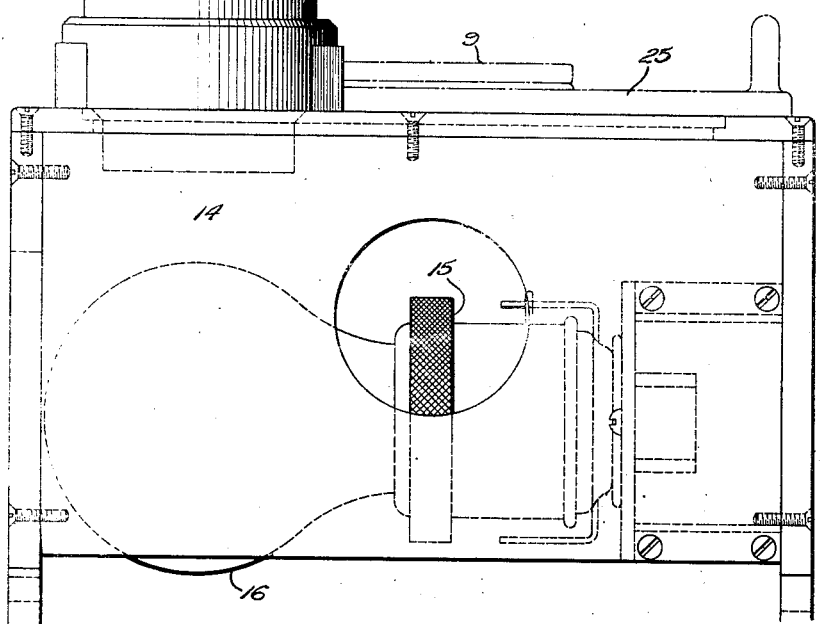

Figs. 12 and 13 are, respectively, sections on the lines 12—12 and 13—13, Fig. 10, and Fig. 14 is a view in perspective of one of the elements of the turret structure.

Heretofore hemoglobinometers of the type most generally used have been highly defective and incapable of giving uniformly accurate or precise results. These devices, involving essentially a container for the blood solution, an element of standard color—usually in the form of a wedge affording the differential required for comparison,—and an associated scale arbitrarily assumed with relation to the said standard color element, have been so constructed as to render the color comparison difficult to the point where variation of many degrees on the scale not only was possible but practically unavoidable, and actual error was introduced through certain factors such for example as that resulting from the difference in the absorption curves of the blood solution and the standard color wedge. So inaccurate have these prior devices been that the medical profession has recognized that tests of hemoglobin made therewith are practically valueless in diagnosis.

We have discovered means whereby, in a device of great simplicity, extremely accurate and dependable color tests may be conducted affording precise indications of the state of the hemoglobin.

Referring to the drawings, our device in a preferred embodiment comprises a body member 1 which may take the form of a glass slide having in its upper surface an open groove or moat 2 which varies longitudinally as to depth. Preferably the moat extends the entire length of the slide, although this is not essential. Immediately adjacent or contiguous to one edge of the moat is a narrow strip 3—the surface of which is very slightly depressed below the normal top surface of the body member. In the present instance the upper surface of the slide on opposite sides of the moat and adjoining strip 3 is ground with exception of a longitudinal strip 4 adjacent the opposite edge of the moat 2, which is left transparent for a purpose hereinafter set forth.

It will be noted that the body member 1 is provided in the under surface with a recess or groove 5 which is of uniform depth throughout and is adapted for reception of a strip 6, preferably of glass, and of a selected standard color, this strip in assembly being secured in the recess 5 by suitable means such as cement. It will be noted by reference to Fig. 6 that the recess 5 in the present instance extends inwardly from the longitudinal edge of the body to a plane normal to the top and bottom surfaces of the body member and including one side surface of the moat 2, and thereby underlies the strip 3 whereby the standard color is visible through this strip from the top of the body member.

In conjunction with this structure, we employ in the present instance a base member or strip 7, shown in Fig. 5, which may be of glass or other translucent material rendered opaque, by means for example of a suitable coating material on its upper face, with the exception of a plurality of spaced windows 8 arranged in a row longitudinally of the strip and opposite each of these windows a number of other suitable indication, which latter conjointly constitute a scale or calibrations with reference to the condition of the hemoglobin. The strip 7 corresponds in width and length with the corresponding dimensions of the body 1, and the scale numbers are so arranged that when this strip accurately underlies the body 1, the windows 8 lie directly under the moat 2 and the adjacent transparent strip 3, the windows corresponding in width to the joint width of the moat and the said transparent strip, while the scale figures underlie the strip 4 which thereby renders these indications visible from the top of the body member. This relative arrangement of parts is clearly shown in Fig. 1 of the drawings, in which is shown a plan view of the assembled instrument. The strip 7 is adapted to be secured by cement or other suitable means to the under side of the body 1, as shown in Fig. 6, and it will be noted that with this construction, the parts in assembly form a unitary slide consisting of the body 1, the standard color strip 6, and the strip 7 including the instrument scale and the windows 8 which function as hereinafter set forth. The instrument further includes a transparent cover plate 9 which when the instrument is in use overlies and rests upon the upper surface of the body member 1, as shown in Fig. 2.

In operation, the blood solution, preferably acidulated to modify suitably the color, is flowed into the moat 2. To this end, it is desirable that the moat be relatively shallow so that capillary attraction may be utilized to carry the solution uniformly through the moat. A relatively shallow moat is also of advantage by reason of the fact that a minimum amount of the blood solution is required. By reason of the slight depression of the surface of the strip 3, the blood solution also flows over this surface, uniformity being assured by the cover strip 9. It will now be apparent that a color comparison may readily be obtained between the blood solution and the standard color 6, this being rendered a relatively simple matter by reason in part of the fact that viewed from above the strip of the blood solution is directly contiguous to and in no way separated from the standard color. Also by reason of the liquid which covers the surface 3, the same surface condition prevails both in the moat and over the adjacent standard color strip so that in comparing the colors the eye does not have to adjust itself to different types of surface. It will be noted further that the differential is in this instance in the blood solution and not in the standard color, as has been customary in prior devices which have employed a standard color strip in the form of a colored glass or other transparent wedge. In the present instance, the chamber which holds the blood solution is so formed that the solution is the differential factor and also fulfills the function previously filled by the aforesaid wedge-shaped standard color strip. The construction is thus materially simplified and errors due to differences in the absorption curves of the two color factors are eliminated.

It will be apparent that the only portions of the moat and of the blood solution contained therein and also of the standard color that are visible to the operator looking downwardly on the slide are those portions which correspond with the individual windows 8. The color factors are thus divided longitudinally into, and thereby in effect are constituted by, a plurality of separate and visibly distinct and closely arranged areas or sections, each section having a predetermined position with respect to the calibrated scale. It will also be noted that each of these visible sections consists of two immediately adjacent or contiguous sections, one showing the blood solution and the other the standard color.

This device materially facilitates a color comparison and greatly increases the accuracy and uniformity of the readings. In operation and as hereinafter set forth, the operator has continuously within the range of his vision at least two and preferably three of the adjacent windows in each of which appears a portion of the differential strip of blood solution and the standard color. He thereby is afforded an opportunity for visual deliberation between different but adjacent areas of one color factor in relation to the other factor. Whereas it is difficult to determine definitely the exact point on a continuous color band at which the colors of the blood solution and standard color correspond, it is extremely simple by means of the present device to locate the point of correspondence by reason of the presence within the field of vision on each side of this point of a segregated section of the bands in which the color factors differ noticeably.

It will be apparent that there may be much modification of the aforedescribed device without departure from the invention. Certain of these modifications are illustrated in Figs. 7, 8 and 9. In Fig. 7, for example, the standard color strip 6a, instead of being between the body portion 1 and the member 7a, is located in a groove in the upper surface of the body 1a adjacent to but in this instance apart from the moat 2a. In the form shown in Fig. 8, the same general construction is employed as shown in Fig. 7 with the exception that the standard color strip 6b extends to and forms a part of one side of the moat 2b. In the form of device illustrated in Fig. 9, the member 7 or its equivalent is eliminated. In this instance, the upper surface of the body member 1c is provided with two longitudinal grooves 10 and 11 which increase in depth from one end towards the other and which are connected by means of a plurality of transverse grooves 12 which correspond in depth to the particular portions of the longitudinal grooves which they respectively adjoin. Adjacent one of the longitudinal grooves is a recess for the standard color strip 6c, and at the opposite side of the other groove are the scale markings which in the present instance are made by means of etched numerals formed in a transparent strip 13 extending longitudinally of the slide. This device accordingly is made of one piece with the exception of the standard color strip 6c, which is cemented or otherwise secured in position in the body member 1c. The device is used in the same manner as described above. It will be apparent that in this latter instance, the color strip 6c might be secured to the underside of the body strip 1c, as in the embodiment illustrated in Figs. 1 to 6.
Attention is directed to the fact that the principle of color comparison involving the visual deliberation described above is capable in embodiment of wide variation. The intermittent color factor effect may be obtained in numerous ways other than those described above. There are to be no limitations in this respect.

There are certain characteristics of the instrument described above which render it highly practical, efficient and durable. One of these is the relative simplicity of cleaning the instrument, this by reason of the use of an open groove or moat as the container for the blood solution. It will be noted in this respect that although the blood solution constitutes the variable color factor the various parts are readily available for cleaning and there is no complication in this respect. Also, by attaching the color glass to the bottom of the body 1 and in the position set forth, absolute proximity or contiguity of the color factors is obtained while keeping the standard color strip and the joint between this strip and the body 1 entirely separated from the blood solution, which further facilitates cleaning and makes for durability. The standard color strip is, in this case, also protected by and confined by the backing strip.

In connection with the foregoing instrument, we provide, as illustrated in Figs. 10 to 14, inclusive, a turret including a source of light and magnifying lens by means of which the reading of the instrument is facilitated. The turret comprises a casing 14 which contains a socket 15 for an electric globe 16. The socket 15 may be of a type including a variable resistance whereby the flow of current through the lamp 16 may be varied to modify the intensity of the light. The casing 14 has in the upper surface an opening in which is seated a member 17 which has adjacent one end an opening 18 in which is secured a color filter which functions as hereinafter set forth. Adjacent the opening 18 is an aperture 20 which functions as a peep hole for a purpose also hereinafter set forth. It will be noted by reference to Fig. 13 that a slide 21 is provided which projects beyond the side of the casing 14 and which in the position shown closes the under end of the aperture 20. This slide may be withdrawn, as hereinafter set forth, to uncover this port.

Immediately above the glass 19, when the member 17 occupies the position in the casing illustrated, is a turret 22 which carries a vertically adjustable magnifying lens 23 and which has at its base a transverse channel 24 adapted for reception of a slide 25, see Figs. 1 and 2, which functions as a carrier for the color comparison chamber as described above and which has a longitudinal opening 26 through which light may pass from below the slide. The carrier 25 and the comparison instrument together with the cover plate 9 neatly fit the transverse passage 24 in the turret so that when the slide is moved into position in the said passage, practically all light is excluded with the exception of that which passes up through the filter glass 19 from the lamp 16.

The filter 19 of translucent material, preferably glass, is carefully selected by test as to color and thickness to bring the colors of the blood solution and the standard into substantially uniformity, so that between the two there is substantially no difference except as to shade or depth of color. It is practically impossible to obtain standard color element that will agree closely with the color of the blood solution, and without such agreement a true color comparison is impossible. This has been a fault of haemacytometers made under the prior practices. By means of a third color applied as in the present instance to modify the light passing through the comparative color factors to the eye, it is possible to so modify both the latter colors as to bring them into entire or substantial agreement, except of course as to shade, which makes accurate color comparison possible and relatively easy.

In operation, the slides are passed under the turret 22 and the lens focused. The slides are then moved transversely until it is noted that in one of the visible color areas the colors of the blood solution and the standard are the same or substantially so. This is determined accurately by comparison not only of the colors of the blood solution and the standard in any one of the exposed areas, but by a comparison of this exposed area with the areas immediately adjacent on each side. During this color comparison, the slide 21 is preferably kept in a position closing the opening 20 so that the scale is not visible. Immediately following determination of the point on the band where the color of the blood solution and the standard correspond, the slide 21 may be withdrawn and a scale number indicating the state of the hemoglobin is exposed.

There may be considerable modification in all parts of the device herein described without departure from the invention. Also, the principles of the invention while of great value as applied to hemoglobinometers may find useful application in part or in whole to color comparison instruments in general, and the invention, therefore, is not restricted, except as specifically stated, to hemoglobinometers.

We claim:

1. A device for measuring the color shade of a test specimen against a standard which includes as a part thereof means affording a calibrated color shade differential in the test color factor, and means whereby the differential factor is divided in the direction of the differential into a plurality of segregated sections, together with means affording a simultaneous and uniformly close comparison between an adjacent plurality of said sections and the standard factor.

2. A device for measuring the color shade of a test specimen, which comprises means affording a fixed calibrated color-shade differential in the test specimen, and a standard color factor cooperative with said differential specimen.

3. A hemoglobinometer comprising means affording comparative color bands, one of which is standard and the other formed by the blood solution, and one of said bands varying longitudinally and constituting the differential factor, and the other of said bands having a uniform color throughout and means for dividing said differential band in the direction of its differential into a plurality of segregated and adjacent visible sections.

4. A hemoglobinometer or like device including a standard color band and adjacent thereto an open groove for reception of a test solution variable longitudinally as to depth.

5. A hemoglobinometer or like device comprising a standard color band uniform throughout its length and adjacent thereto an open groove variable longitudinally as to depth.

6. A hemoglobinometer or like device comprising a standard color band and adjacent thereto an open groove variable longitudinally as to depth, and means for dividing the said groove longitudinally into a plurality of adjacent operative sections.

7. A hemoglobinometer or like device comprising a translucent color band, and a groove adjacent to said band having a translucent base and variable longitudinally as to depth, and means for rendering sections of said groove opaque thereby affording a plurality of segregated and adjacent effective areas.

8. A hemoglobinometer or like device comprising a standard color band, and an open groove varying longitudinally as to depth, said band and groove being effectively contiguous and having a common boundary plane.

9. A hemoglobinometer or like device comprising a standard color area, and an open groove varying longitudinally as to depth, said groove and color area being so relatively arranged that the side edge of said groove lies in a plane containing one edge of said color area.

10. A hemoglobinometer or like device comprising a glass slide having therein an open-topped groove varying longitudinally as to depth, and including a standard color element one edge of which lies in a plane at right angles to that surface of the slide in which the groove is formed which plane also contains one side edge of said groove.

11. A hemoglobinometer or like device comprising a body portion having in one face thereof an open groove varying longitudinally as to depth and a standard color element operatively associated with the body portion and extending parallel to said groove.

12. A hemoglobinometer or like device comprising a body portion having a series of open recesses varying as to depth and adapted for reception of a test solution, and a standard color element operatively associated with said body portion and cooperatively arranged with respect to said recesses to afford a comparison between the said element and the test solution.

13. A hemoglobinometer or like device comprising a body portion having in one face thereof an open groove for reception of the blood solution, said body having a recess in its under side, and a standard color element secured in said recess and cooperatively arranged with respect to said groove.

14. A hemoglobinometer or like device comprising a body element having grooves in opposite faces thereof, and a standard color element mounted in one of said grooves.

15. A hemoglobinometer or like device comprising a body portion grooved on its opposite faces and with the edge of one groove in a plane including one edge of the other groove, and a standard color element mounted in one of said grooves.

16. A hemoglobinometer or like device comprising a body element having grooves in opposite faces, one of said grooves varying longitudinally as to depth, and a standard color element mounted in one of said grooves.

17. A hemoglobinometer or like device comprising a body element having grooves in opposite faces, one of said grooves varying longitudinally as to depth, and a standard color element mounted in the other of said grooves.

18. A hemoglobinometer or like device comprising a slide having an open groove in its upper face varying longitudinally as to depth, a standard color element permanently attached to said slide in cooperative relation with said groove, and at the bottom of said slide an opaque element having transparent areas so arranged with respect to said groove and the standard color element as to divide the latter into a longitudinal series of adjacent segregated transparent sections.

CARL ADOLPH HAUSSER.
ANTHONY ADOLPH HAUSSER.